F. ENGLISH.
SHAFT OILER OR LUBRICATOR.
APPLICATION FILED JULY 20, 1918.
1,310,611.
Patented July 22, 1919.
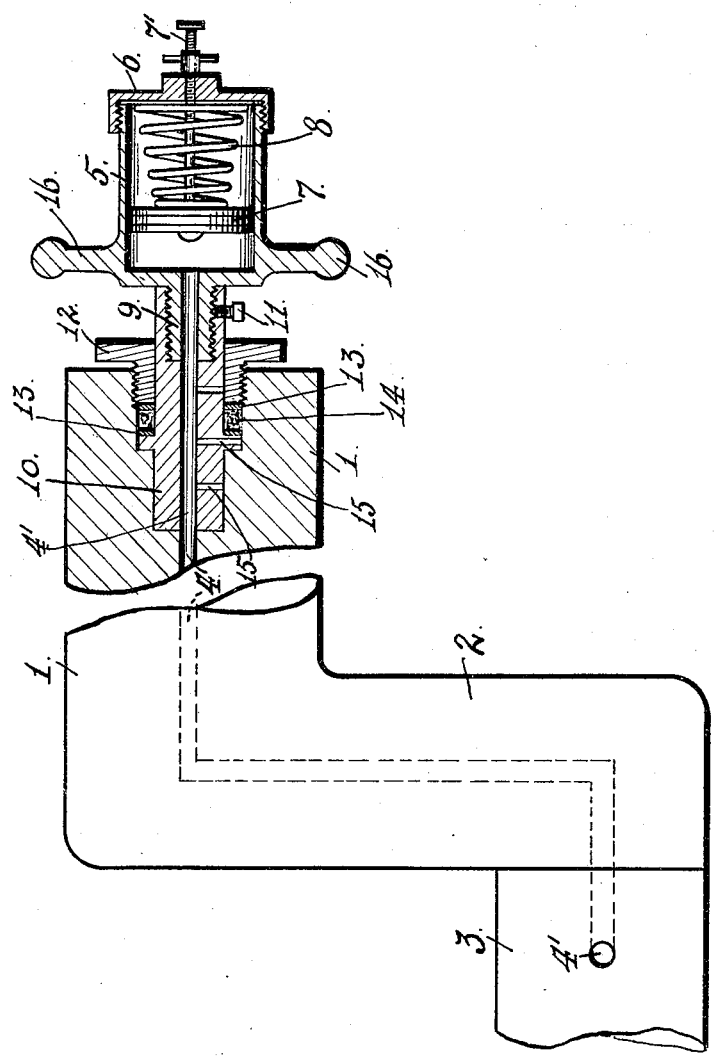
WITNESS:
Wm F. Drew
INVENTOR.
Frank English
BY
Booth & Booth
ATTORNEYS.

UNITED STATES PATENT OFFICE.

FRANK ENGLISH, OF FRESNO, CALIFORNIA.

SHAFT OILER OR LUBRICATOR.

1,310,611.  Specification of Letters Patent.  Patented July 22, 1919.

Application filed July 20, 1918. Serial No. 245,924.

*To all whom it may concern:*

Be it known that I, FRANK ENGLISH, a citizen of the United States, residing at Fresno, in the county of Fresno and State of California, have invented certain new and useful Improvements in Shaft Oilers or Lubricators, of which the following is a specification.

My invention relates to that form of shaft-lubrication which involves the application of a grease-cup, and is especially concerned with the mounting of the grease-cup directly upon the shaft.

In cases like this, the grease-cup is connected with the shaft in the axis of the latter, and necessarily rotates therewith on a common axis. But this results in the disadvantage of having to stop the shaft, in order to replenish the cup.

It is this disadvantage which my invention is intended to overcome.

The object of my invention is, therefore, to provide for replenishing the grease-cup without stopping the rotation of the shaft, and to this end my invention consists essentially and fundamentally in the provision of a connection, without regard to its specific character (which may be varied to suit good mechanical practice) which will permit a relative movement of shaft and grease-cup upon their common axis, whereby it is possible to hold the grease-cup against rotation without arresting the rotation of the shaft, and thereby permit the cup to be refilled when required.

In the accompanying drawing, I have illustrated my invention in one form of connection, which, as far as I now know, is a practical one, though it must be understood that I do not confine myself to this form, as it may be varied in shape and construction, provided it embodies and comprises the essential feature of the provision of means for permitting a relative movement of shaft and cup upon their common axis.

In the drawing, the figure represents in elevation, a common crank-shaft, broken, one end being in section showing the grease-cup and its connection, both cup and connection being in section.

1 is a shaft having a crank 2, wrist pin 3, and oil-duct 4, the latter emerging at 4' in the wrist-pin for lubricating the bearing of the connecting rod, not shown. This form of oil duct is not essential to my invention, and is here shown merely for the sake of illustration.

5 is a grease-cup of common general construction, having a removable cap 6, an internal plunger 7, operated by a screw stem 7' from the exterior and controlled by a spring 8. 9 is the nipple of the grease-cup.

Fitted for rotation in the axis of the shaft 1, is a tubular plug 10, held in place by a suitable stuffing-box assemblage, comprising a gland nut 12, washers 13 and intervening packing 14. The journal or bearing surface of this plug may be kept lubricated by small radial ducts 15 leading from the bore 4' of the plug, which bore forms part of the main duct 4 leading from the grease-cup to the wrist-pin.

Into the outer end of the plug 10 is fitted the nipple 9 of the grease-cup and is held fixed therein by the set screw 11. The base of the grease-cup 5 is provided with a handle 16.

Normally, the shaft and grease-cup rotate together, on their common axis. But when it is necessary to replenish the cup with grease, the cup is taken hold of, conveniently by its handle 16, and its rotation is stopped, the shaft, meanwhile, continuing its rotation upon the now stationary plug 10 as a bearing. The cup may be held manually, but more conveniently by hanging a weight from its handle 16. While so held, the cap 6 and the internal parts may be readily removed and fresh grease supplied. As soon as the cup is released, it will again turn with the shaft.

I claim:—

1. In combination with a rotatable shaft and a grease-cup, having a common axis, a journal-bearing connection between the two adapting them for relative movement on their common axis; and a stuffing box assemblage for holding the journal bearing connection in place.

2. In combination with a rotatable shaft and a grease-cup, the two having a common axis, a connecting member between them, fixed with relation to one and rotatable with relation to the other.

3. In combination with a rotatable shaft and a grease-cup, the two having a common axis, a connecting member between them, fixed with relation to one and rotatable with relation to the other; and a stuffing box assemblage for holding the connecting member in place.

4. In combination with a rotatable shaft and a grease-cup, having a common axis, a connection between the two adapting them for relative movement on their common axis, and a handle member on the grease-cup whereby the rotation of the cup may be stopped to permit replenishing.

5. In combination with a rotatable shaft and a grease-cup, the two having a common axis, a connecting member carrying the grease-cup and rotatably mounted in the axis of the shaft, and a handle member on the grease-cup whereby the rotation of the cup may be stopped to permit replenishing.

6. In combination with a rotatable shaft having an axial duct and a grease-cup, having its axis common with that of the shaft, a tubular plug carrying at one end the grease-cup and journaled at its other end for rotation in the axis of the shaft.

7. In combination with a rotatable shaft having an axial duct and a grease-cup, having its axis common with that of the shaft, a tubular plug carrying at one end the grease-cup and journaled at its other end for rotation in the axis of the shaft, and a handle member on the grease-cup, whereby the rotation of the cup and plug may be stopped to permit the cup to be replenished.

8. An oiler or lubricator for the described purpose, comprising a grease-cup, a tubular member fitted to the discharge end of said cup, and a stuffing box assemblage carried by said tubular member adapting it for a journal connection with a rotatable shaft.

9. An oiler or lubricator for the described purpose, comprising a grease-cup provided with a handle member, a tubular member fitted to the discharge end of said cup, and a stuffing box assemblage carried by said tubular member adapting it for a journal connection with a rotatable shaft.

In testimony whereof I have signed my name to this specification in the presence of two subscribing witnesses.

FRANK ENGLISH.

Witnesses:
 Jos. BARCROFT.
 W. J. TRINDADE.

Copies of this patent may be obtained for five cents each, by addressing the "Commissioner of Patents, Washington, D. C."